Feb. 10, 1953          R. M. PAGE          2,628,350

RADIO FREQUENCY ENERGY RANGE AND DIRECTION FINDER

Filed July 27, 1942          3 Sheets-Sheet 1

Inventor
Robert M. Page

Feb. 10, 1953 R. M. PAGE 2,628,350
RADIO FREQUENCY ENERGY RANGE AND DIRECTION FINDER
Filed July 27, 1942 3 Sheets-Sheet 3

Inventor
*Robert M. Page*
By
Attorney

Patented Feb. 10, 1953

2,628,350

UNITED STATES PATENT OFFICE 2,628,350

RADIO FREQUENCY ENERGY RANGE AND DIRECTION FINDER

Robert M. Page, Washington, D. C.

Application July 27, 1942, Serial No. 452,535

13 Claims. (Cl. 343—11)

(Granted under Title 35, U. S. Code (1952), sec. 266)

This invention relates to methods of and means for direction finding and more particularly to direction finders adapted to operate in connection with radio echo apparatuses to accurately determine range and direction of remote objects.

Direction finders provided heretofore for determining the direction of a source of electrical energy or for indicating relative positions of moving craft with respect to a source of electrical energy, between aircraft and radio beacons for example, consist of complex circuits for measuring variations of frequency or phase, from which directional indications are derived. Such apparatuses are not readily calibrated to accurately determine and indicate direction.

Moreover, with regard to radio echo apparatuses disclosed by the prior art, directional indications of remote objects are derived from angular positions of the directional beam antenna associated with such apparatuses. Since the beam of the directional antenna must, because of necessity, have a width of substantially large dimensions, representation of echo pulses on the indicator will not necessarily infer that the antenna is pointing directly toward the object. It therefore becomes necessary for the operator of conventional radio echo apparatuses to continually adjust the direction of the antenna until echo pulses of maximum amplitude are produced on the indicator. It is assumed, when echo pulses of maximum amplitude are indicated, that the portion of the beam having the greatest power is directed toward the object, and consequently the antenna is likewise pointing directly toward the object. The foregoing method of obtaining direction is not satisfactory, especially in instances where a high degree of accuracy is required, for example, such as fire control apparatus. The accuracy of this method is substantially limited because the speed in obtaining indications of the highest possible degree of accuracy is substantially reduced since only single instantaneous representations of the echo pulses are provided and furthermore, because the accuracy of the directional indications and the speed in determining the same depends, to a great extent, upon the skill of the operator.

It is therefore an object of the present invention to provide a novel method of direction finding whereby extremely accurate directional indications are rapidly obtained.

Another object is to provide a novel direction finder that operates in a manner to overcome the disadvantages enumerated heretofore.

Another object is to provide a novel direction finder of the above type that is capable of operation in connection with conventional radio echo apparatuses for rapidly obtaining accurate indications of direction of remote objects.

Another object is to provide a novel apparatus for indicating direction of a craft with respect to a source of electrical energy and for indicating the amount and the direction that the craft deviates away from the source.

Another object is to provide a direction finder having a directional antenna and a cathode ray indicator with novel means for producing a receiving beam or pattern from the antenna and for conically rotating the beam so that the latter describes a circle about a source of electrical energy, as well as means for producing a circular sweep on the indicator that corresponds to the circle described about the electrical source and for varying the position of the circle on the indicator in accordance with variations in the position of the circle about the source whereby continuous indications of direction between the source and the antenna are obtained.

Still another object of the present invention is to provide novel means adapted to be utilized in connection with radio echo apparatuses for receiving and indicating echo pulses to determine range of remote objects as well as continually representing the relative directional characteristics of the apparatuses with respect to the object.

Still another object is to provide a radio echo apparatus including novel means for producing indications in response to reception of echo pulses from a remote object which continually represent range of the object and the direction that the antenna of the apparatus is pointing with respect to the object, as well as the amount that the antenna is directed away from a position wherein the latter is pointed directly toward the object.

Still another object is to provide a radio echo apparatus including novel means of the above character that is of relatively simple design and construction, and that is capable of producing highly accurate indications of direction of remote objects without relying upon extraordinary skill on the part of the operator of the apparatus.

Other objects and features of the invention will appear more fully from the following detailed description when considered in connection with the accompanying drawings which disclose several embodiments of the invention. It is to be expressly understood, however, that the drawings are designed for purposes of illustration only and not as a definition of the limits of the invention, reference for the latter purpose being had to the appended claims.

In the drawings, wherein similar reference characters denote similar parts throughout the several views.

It is contemplated by the present invention to provide means associated with a directional antenna for producing a directional receiving beam or pattern and for rotating the beam in such a manner to describe a conical envelope, with the apex thereof at the antenna. The antenna is directed toward a source of electrical energy, such as an aircraft radio beacon, for example, so that the rotating beam encloses the electrical source. When the antenna is adjusted so that the same is pointing directly toward the source, in which case the circular path of the beam lying in a plane perpendicular to the axis of the conical envelope is equally distant therefrom, current is induced in the antenna and the associated means that remains constant upon rotation of the beam. However, when the rotating beam does not follow a circular path that is equally distant from the source, that is, when the antenna is not pointing directly toward the source, currents induced in the antenna vary for instantaneous positions of the beam during rotation thereof. By producing a rotating circular sweep on an oscillograph, and by varying the position and characteristics thereof with respect to the center of the oscillograph screen in accordance with the currents induced in the antenna, the directional relationship of the antenna and the source of electrical energy is obtained. When the beam follows a circular path equally distant from the electrical source the rotating circular sweep on the oscillograph screen is symmetrical with respect to the center of the screen, thus indicating that the antenna is pointing directly toward the source of electrical energy. However, when the source is not equally distant from the circular path of the beam the varying currents induced in the antenna and the associated means displace or distort the circular sweep. Such a distortion or asymmetrical position of the circular sweep corresponds to the relative positions of the circular path of the beam and the source of electrical energy. From such an indication on the oscillograph it can be readily and quickly comprehended that the antenna is not pointing directly toward the source, and the amount and direction that it is required to move the antenna so that the latter is pointing directly toward the source is determined.

Figure 1:
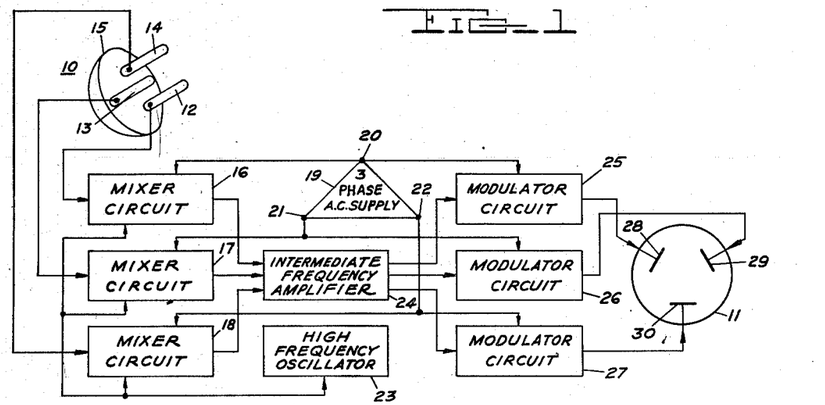
Fig. 1 is a diagrammatic showing of a direction finder constructed in accordance with the principles of the present invention.

With reference more particularly to Fig. 1 of the drawings a direction finder including the foregoing means is disclosed therein comprising a rotatable directional antenna 10 and a suitable indicator such as a cathode ray oscillograph 11. Antenna 10 includes antenna members 12, 13 and 14, disposed 120° with respect to each other on a parabolic reflector 15 at equal distances from the focal point thereof. Antenna members 12, 13 and 14 are respectively connected to the input terminals of mixer circuits 16, 17 and 18, each of which are respectively supplied with sinusoidal modulating voltages from a three-phase alternating current supply 19. The modulating voltages supplied to the mixer circuits are 120° out of phase with respect to each other, mixer circuit 16 being supplied from point 20 of supply 19, while mixer circuits 17 and 18 are respectively supplied from points 21 and 22 thereof. With the foregoing arrangement, the signals induced in antenna members 12, 13 and 14 are fed to their respective mixer circuits wherein the inputs are modulated by the sinusoidal varying three-phase voltage. This function of three-phase sinusoidal modulation in connection with antenna members 12, 13 and 14 disposed 120° with respect to each other produces a directional receiving beam, that conically rotates, developing a complete conical envelope, with the apex thereof at the antenna, upon each cycle of sinusoidal varying voltage from supply 19. It may be considered that a separate beam is produced from each of the antenna members, and the 3-phase sinusoidal modulation of the mixer circuits modulate the three beams in such a manner to produce a resultant beam which conically rotates, in a manner noted above. It is to be expressly understood that numerous means other than electronic means described above may be provided for producing and conically rotating a beam. For example, a single antenna member, coupled to a suitable receiver, may be positioned on a parabolic reflector to produce a beam with directional characteristics, with suitable means for moving the reflector or the antenna member individually or the entire assembly in a unit to produce conical rotation of the beam.

In order to obtain high sensitivity that is maintained constant regardless of the input frequency to the mixer circuits and also to permit radio frequency amplification at relatively low frequency with a high gain, the input frequency to mixer circuits 16, 17 and 18 is changed to a suitable intermediate frequency by combining the input frequency with the output of a stable high frequency oscillator 23. The intermediate frequency of the mixer circuits, modulated by the sinusoidal voltages from source 19, is fed to an intermediate frequency amplifier 24 wherein the modulated signals at the intermediate frequency are amplified and subsequently fed to modulator circuits 25, 26 and 27. The modulator circuits are supplied with sinusoidal modulating voltages from the three-phase alternating current supply 19, the supply to each of the modulator circuits being 120° out of phase with respect to each other. More particularly, modulator circuit 25 is supplied from point 20 of supply 19, while modulator circuits 26 and 27 are respectively supplied from points 21 and 22 of the three-phase supply. The outputs of the modulator circuits are each fed to the deflection plates of oscillograph 11, which is of a three-phase type having deflection plates 28, 29 and 30 orientated 120° with respect to each other about the central axis of the oscillograph. The output of modulator circuit 25 supplies voltage to deflection plate 28, while the outputs of modulator circuits 26 and 27 are respectively connected to deflection plates 29 and 30.

Due to the sinusoidal modulating voltages, 120° out of phase with respect to each other, supplied to modulator circuits 25, 26 and 27, the varying voltages impressed on deflection plates 28, 29 and 30 continually vary the electron beam of the oscillograph in such a manner as to produce a rotating circular sweep on the viewing screen of oscillograph 11. When the voltages impressed on the deflection plates vary uniformly as a function of the sine the circular sweep produced thereby is symmetrical with respect to the center of the oscillograph screen; however, when the voltages do not vary uniformly, the circular sweep is distorted from the above mentioned symmetrical position on the screen in accordance with the non-uniformity of the voltages applied to the deflection plates. Since mixer circuit 16 and modulator circuit 25 are supplied with sinusoidal modulating voltage of the same phase, from point 20 of supply 19, the signals modulated in modulator circuit 25, and consequently the voltage impressed on deflection plate 28, corresponds to the signals received at antenna member 12 and passed to mixer circuit 16. Also, since mixer circuit 17 and modulator circuit 26, and mixer circuit 18 and modulator circuit 27, are supplied with sinusoidal modulating voltages of similar phase from points 21 and 22 respectively, the voltage impressed on deflection plate 29 corresponds to the signals received at antenna member 13 while the voltage supplied to deflection plate 30 corresponds to the signals received at antenna member 14. The position of the rotating circular sweep on the oscillograph screen is thus varied in accordance with the amplitude of the signals received at antenna members 12, 13 and 14.

As stated heretofore, when antenna 10 is pointing directly toward a source of electrical energy the conically rotating beam follows a circular path about the source that is equally distant therefrom. Equal signals are therefore induced in antenna members 12, 13 and 14, and the outputs of mixer circuits 16, 17 and 18 equally vary as a function of the sine, the output being 120° out of phase with respect to each other. Since, under these conditions, equally varying inputs are fed to modulator circuits 25, 26 and 27 the voltages impressed on deflection plates 28, 29 and 30 vary equally as a function of the sine, each being 120° out of phase with respect to each other, thus producing a rotating circular sweep on the oscillograph screen that is symmetrical with respect to the center of the screen. From such position of the circular sweep it can be readily determined that antenna 10 is pointing directly toward the source of electrical energy. When the antenna is not pointing directly toward a source of electrical energy, the beam describes a circle about the source that is not equally distant therefrom. Consequently, unequal varying currents are received at antenna members 12, 13 and 14, and the output of mixer currents 16, 17 and 18 vary as the function of the sine, with unequal amplitudes, each being 120° out of phase with respect to the other outputs. Since, as mentioned heretofore, the outputs of modulator circuits 25, 26 and 27 respectively correspond to the inputs of mixer circuits 16, 17 and 18, the outputs of the modulator circuits, and consequently the voltages impressed on corresponding deflection plates, likewise sinusoidally vary with similar unequal amplitudes. The circular rotating sweep produced on the screen of oscillograph 11 under these conditions is not symmetrical with respect to the center of the screen but is distorted in accordance with the unequal amplitudes of the sinusoidally varying voltages impressed on the deflection plates thereof. For example, when antenna 10 is directed toward a source of electrical energy so that the beam follows a circular path about the source in such a manner as to induce higher current in antenna member 14 than in antenna members 12 and 13, the sinusoidally varying voltage output of mixer circuit 18, and consequently the output of modulator circuit 27, is of a certain amplitude, greater than the amplitude of the sinusoidal varying voltage outputs of modulator circuits 25 and 26. When such sinusoidal three-phase voltages, of unequal amplitude, are impressed on the deflection plates, the circular sweep produced thereby is distorted adjacent deflection plate 30. Such distortion of the circular sweep indicates that antenna 10 is not pointing directly toward the source of electrical energy. Since the electron beam of the oscillograph rotates in synchronism with conical rotation of the beam, the distorted portion of the circular sweep indicates the direction in which the antenna needs to be moved so as to point directly toward the source of electrical energy, while the degree or amount of the distortion represents the extent antenna 10 must necessarily be moved so as to occupy a position wherein the same is pointing directly toward the source of electrical energy.

With an arrangement of the foregoing character, the direction of the apparatus with respect to a source of electrical energy; for example, direction of an aircraft with respect to a radio beacon, is obtained from angular positions of the antenna with a high degree of accuracy. Indications derived by the foregoing apparatus are of an extremely high degree of accuracy since errors due to the width of the directional energy beam as in the prior systems are eliminated, and since the indication produced by the instant apparatus continually shows that the antenna is pointing directly toward a source of electrical energy or the direction and degree in which the antenna needs to be moved when the same is not pointing directly toward the source, thus substantially reducing the skill required on the part of the operator.

Figure 2:
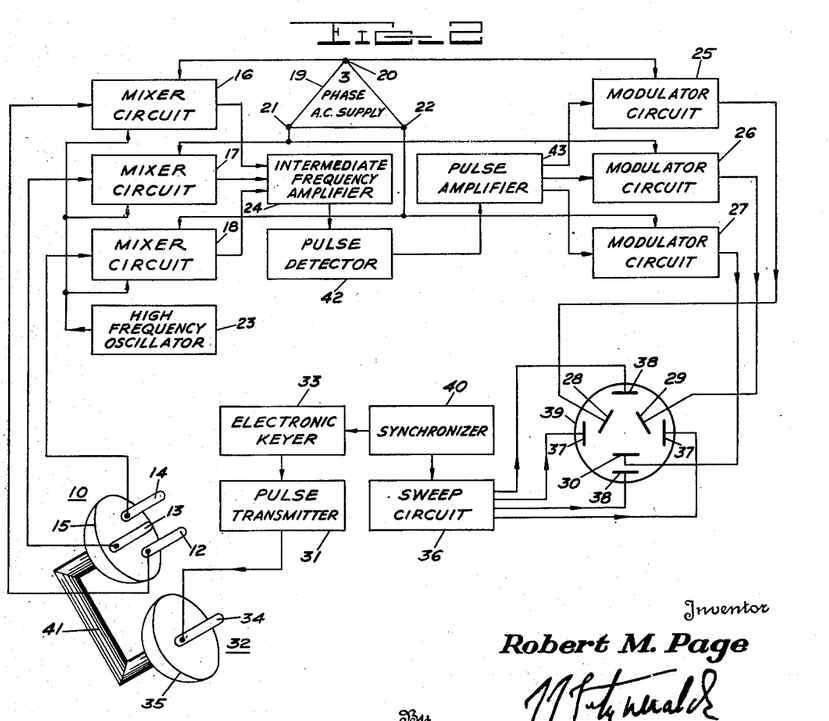
Fig. 2 is a diagrammatic showing of a radio echo apparatus embodying the principles of the present invention.

A radio echo apparatus embodying the principles of the present invention discussed heretofore is disclosed in Fig. 2. The apparatus functions to produce remote object indications, in response to reception of echo pulses reflected from remote objects, which continually represent range of a remote object and whether or not the antenna of the apparatus is pointing directly toward such object, as well as the amount and the direction in which the antenna needs to be moved so that the latter is pointing directly toward the object. As shown, the radio echo apparatus includes a radio pulse transmitter 31, the output of which is fed to rotatable directional beam antenna 32 from which radio energy pulses are emitted. The rate of emission of radio energy pulses from antenna 32 is determined by electronic keyer 33 which controls operation of transmitter 31. Antenna 32 is of any conventional design to provide the required directional characteristics and is disclosed herein including antenna member 34 mounted on a parabolic reflector 35 at the center thereof. The radio echo apparatus also includes sweep circuit 36, the output of which feeds to the horizontal deflection plates 37, 37 and to the vertical deflection plates 38, 38 of oscillograph 39. Sweep circuit 36 may be of any suitable conventional design capable of producing the number of sweep lines necessary to allow operation of the apparatus within the desired range. In order to initiate the line sweeps on oscillograph 39 at the same instant a radio energy pulse is emitted from antenna 32, synchronizer 40 is provided with connections to electronic keyer 33 and sweep circuit 36. This arrangement is well understood by those skilled in the art and provides means for producing indications on oscillograph 39 from which range of remote objects are obtained.

The apparatus included in the radio echo apparatus for receiving echo pulses when radio energy pulses emitted from antenna 32 impinge upon and are reflected from remote objects, and for producing indications of the echo pulses on the sweep of oscillograph 39 embodies the principles of the direction finder previously described with certain modifications therein to render the same effective for receiving radio energy pulses. Such apparatus includes directional antenna 10 having antenna members 12, 13 and 14 thereof respectively connected to mixer circuits 16, 17 and 18. The mixer circuits are supplied with sinusoidal three-phase modulating voltages to produce a beam, extending from antenna 10, and for conically rotating the beam in a manner fully discussed heretofore. Antennas 10 and 32 are mounted adjacent each other on a suitable support 41 to allow the antennas to be moved as a unit to any desired position.

As in the previous embodiment, the outputs of mixer circuits 16, 17 and 18 are fed to intermediate frequency amplifier 24, the frequency of which is determined by high frequency oscillator 23. The output of intermediate frequency amplifier 24 is passed through a pulse detector 42 and pulse amplifier 43 to the input of modulator circuits 25, 26 and 27. Pulse detector 42 is responsive only to the echo pulses fed to the input of the mixer circuits to thus prevent the flow of alternating current from supply 19 therethrough, while pulse amplifier 43 functions to amplify the output of pulse detector 42 in a conventional manner. Modulator circuits 25, 26 and 27 are supplied with sinusoidal voltages 120° out of phase with respect to each other, from supply 19, whereby the modulated output signal of each of the modulator circuits correspond to the echo pulse input to their respective mixer circuits. In this embodiment modulator circuits 25, 26 and 27 are designed in such a manner as to prevent the flow of alternating current from source 19 to deflection plates 28, 29 and 30. The output of the modulator circuits thus comprises pulses, the amplitude of which vary sinusoidally with a 120° phase difference between the output of each modulator circuit. The voltages impressed on deflection plates 28, 29 and 30 of oscillograph 39 therefore respectively correspond to the echo pulses induced in antenna members 12, 13 and 14.

Figure 3:
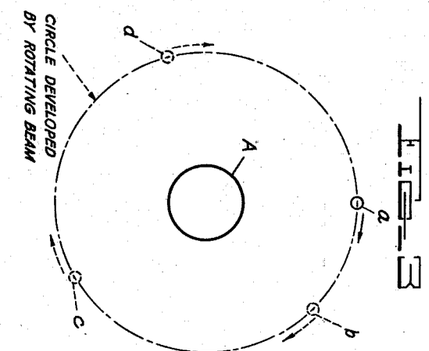
Fig. 3 is a diagrammatic showing of the path followed by the rotating sensitive beam with respect to a remote object when the antenna is pointing directly toward the object.
Figure 4:
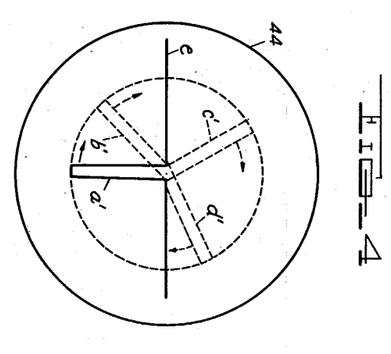
Fig. 4 is a diagrammatic showing of the indications produced on the oscillograph when the sensitive beam rotates in a manner disclosed in Fig. 3.

When support 41 is adjusted so that radio energy pulses emitted from antenna 32 impinge upon and are reflected from a remote object, and so that the conically rotating beam projecting from antenna 10 follows a circular path about the remote object that is equally distant therefrom, an indication is produced on the viewing screen of oscillograph 39, from which range and direction of the remote object are obtained. The foregoing may be more readily comprehended with reference to Figs. 3 and 4. In Fig. 3, the beam is schematically designated by $a$, while $b$, $c$ and $d$ represent instantaneous positions of the beam as the latter follows a circular path about object A that is equally distant therefrom. Since the beam is at all times equally distant from the object, echo pulses received thereby, for all positions thereof, will induce equal currents in antenna 10. The echo pulse input to mixer circuits 16, 17 and 18 therefore sinusoidally vary equally with 120° phase difference therebetween. The output of mixer circuits 16, 17 and 18 are then fed through intermediate amplifier 24, pulse detector 42 and pulse amplifier 43 to the inputs of modulator circuits 25, 26 and 27. Since each of the modulator circuits are supplied with a sinusoidal modulating voltage of the same phase as the modulating voltage supplied to corresponding mixer circuits, the output of each modulator circuit corresponds to the echo pulse at their respective mixer circuit. Also, since the inputs in the mixer circuits vary equally in amplitude with respect to each other, the output of modulator circuits 25, 26 and 27 comprises pulses, the amplitudes of which equally vary as a function of the sine, with the variations being 120° out of phase with respect to each other. When such sinusoidally varying pulses are impressed on deflection plates 28, 29 and 30, pulse indications are produced on the screen 44 of oscillograph 39, the amplitude of which corresponds to the distance between the object and the beam at a position represented by the angular displacement of the pulse indications, and such pulse indications are rotated about a fixed point on the screen in synchronism with rotation of the beam about the object. Since the beam remains an equal distance from the object throughout a complete revolution, and since the amplitude pulses are 120° out of phase with respect to each other, the pulse indications produced on the oscillograph screen describe a circle on screen 44 that is equally distant from the center thereof. As shown in Fig. 4, when the beam is in position $a$, a resultant pulse indication $a'$ is produced on the oscillograph screen. As the beam rotates in a clockwise direction the pulse indications on the screen rotate in synchronism therewith; instantaneous pulse indications $b'$, $c'$ and $d'$ corresponding to instantaneous positions $b$, $c$ and $d$ of the beam shown in Fig. 3. The circle produced on the oscillograph screen is symmetrical with respect to the center thereof and thus indicates that antenna 10 is pointing directly toward the remote object.

Since the radio energy pulses emitting from antenna 32, and the sweep produced on the screen of oscillograph 39 in response to the voltages applied to the horizontal and vertical deflection plates thereof, are synchronized by synchronizer 40, indications of range of remote objects are readily obtained in a manner fully understood by those skilled in the art. By proper calibration, the time required for a radio energy pulse to propagate from antenna 32 to the remote object and reflect therefrom in a form of an echo pulse, and for the echo pulse to be received and indicated on the line sweep e is a measurement of distance of the remote object which is readily determined from the position of the pulse indication on the line sweep e. As mentioned heretofore, and as shown in Fig. 4, the echo pulse indications on the oscillograph screen continually rotate about a fixed point on sweep line e, the position of which corresponds to the range of the remote object about which the beam rotates.

Figure 5:
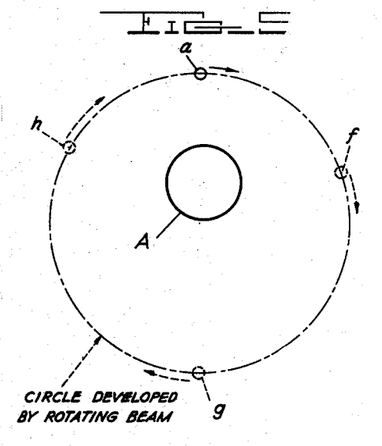
Fig. 5 is a diagrammatic showing of the path followed by the rotating beam with respect to a remote object when the antenna is not pointing directly toward the object.
Figure 6:
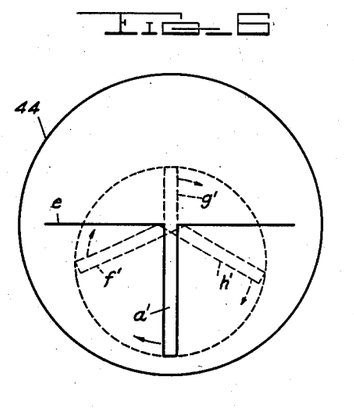
Fig. 6 is a diagrammatic showing of the indications produced on the oscillograph when the beam rotates in a manner disclosed in Fig. 5.

As stated heretofore, it has been found from operation of conventional radio echo apparatuses that indications of echo pulses are produced when the radio energy pulses are not emitted directly toward a remote object, and it is therefore necessary to continually adjust the direction of the transmitting antenna until indications of pulses of maximum amplitude were obtained. This method of obtaining direction is not satisfactory and accurate directional indications are not obtained therefrom. When antenna 32 is not emitting radio energy pulses directly toward a remote object, but when certain radio energy pulses emitted therefrom impinge upon the object causing reflection of echo pulses of sufficient power to produce an indication on the oscillograph of the range and general direction of the object, the instant apparatus functions to indicate the exact direction of the object, as well as the amount and direction in which antenna 10 must be moved to occupy a position wherein radio energy pulses are emitted directly toward the object. As shown in Fig. 5, when antenna 32 is not pointing directly toward remote object A, the circular path followed by the beam is not equally distant from the object. As the beam follows the path shown in Fig. 5 an echo pulse of maximum power is induced in the antenna when the beam is at position a, while, when at position g more remote from the object, the echo pulse induced in the antenna possesses less power. The input to mixer circuits 16, 17 and 18 thus unequally vary as the beam rotates about the object, and consequently the sinusoidally varying pulse outputs of modulator circuits 25, 26 and 27 have unequally varying amplitudes. Such voltages impressed on deflection plates 28, 29 and 30 produce pulse indications on oscillograph screen 44 that vary in amplitude, in accordance with the varying distance between the object and the beam as the latter rotates, thus producing a circular envelope that is not symmetrical with respect to the center of the oscillograph screen. More particularly, as shown in Fig. 6, when the beam is at position a, pulse indication a' of maximum amplitude is produced. As the beam rotates about the object in a clockwise direction, the distance thereof from the object increases thus decreasing the amplitude of the pulse indication until the beam reaches position g which produces pulse indication g' of minimum amplitude. As the beam continues to rotate the pulse indications rotate therewith with gradually increasing amplitude. The pulse indications originate at a fixed point on sweep line e, from which range of a remote object may be obtained. This point represents the position of the remote object while the circle described by the rotating pulse indications represent a circular path of the rotating beam. The indication therefore discloses the directional characteristics between antenna 10 and the object, as well as indicating the amount and direction in which antenna 10 must be moved in order to point the latter directly toward the object.

Figure 7:
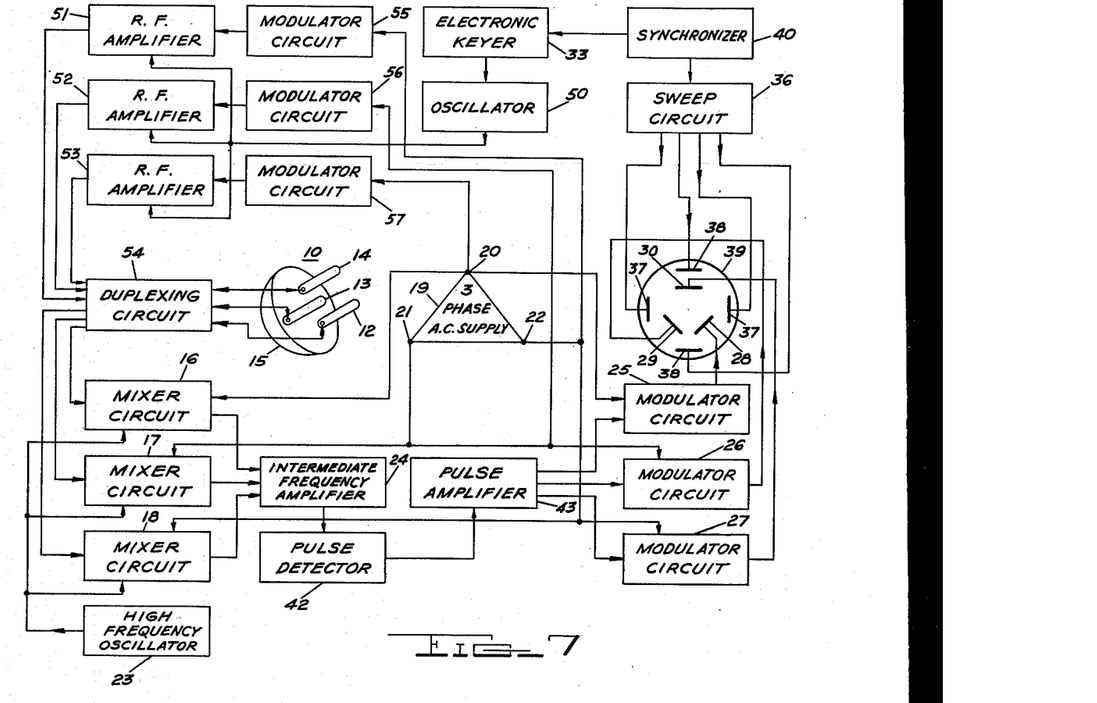
Fig. 7 is an illustration of a further embodiment of the invention.

A further embodiment of the invention is shown in Fig. 7. This embodiment discloses a radio echo apparatus embodying the novel means incorporated in the apparatus shown in Fig. 2 as well as other novel means for further improving the accuracy of the directional indications produced thereby. The foregoing is accomplished by utilizing a single directional beam antenna for transmission as well as for reception, and by conically rotating the transmitted beam of radio energy as well as the radio energy receiving beam. The apparatus shown in Fig. 7 is somewhat similar to the disclosure of Fig. 2 and corresponding elements therein are designated by similar reference characters.

In order to produce a conically rotating beam of radio energy a radio frequency oscillator 50 is provided, the output of which feeds to radio frequency amplifiers 51, 52 and 53. Operation of oscillator 50 is controlled by electronic keyer 33 in such a manner that equally spaced radio frequency pulses are produced thereby at a predetermined rate controlled by synchronizer 40. The output of radio frequency amplifiers 51, 52 and 53 are individually fed to separate antenna elements 12, 13 and 14 of directional beam antenna 10. Duplexing circuit 54 is included in the connections between the amplifiers and the antenna elements for a purpose that will appear more fully hereinafter. Modulator circuits 55, 56 and 57 are respectively connected to amplifiers 51, 52 and 53 to modulate the pulsating outputs of the amplifiers in such a manner that a directional conically rotating beam of radio energy is emitted from antenna 10. For this purpose, modulator circuits 55, 56 and 57 each have a separate connection with three-phase alternating current supply 19. Modulator circuit 57 is connected to point 20 of supply 19, while modulator circuits 56 and 55 are respectively connected to points 21 and 22. With such an arrangement, the output of the radio frequency amplifiers varies as a function of the sine with a 120° phase difference between the output of each amplifier. The energy applied to antenna elements 12, 13 and 14 thus comprises radio frequency pulses, the amplitudes of which vary sinusoidally, with a 120° phase difference between the energy applied to each element. A directional beam of radio energy is therefore emitted from antenna 10 which conically rotates, completing one complete revolution for each complete cycle of the sinusoidal bias from supply 19.

Duplexing circuit 54 is provided so that antenna 10 may be employed for transmission as well as reception. Antenna elements 12, 13 and 14 are also individually connected through the duplexing circuit to mixer circuits 16, 17 and 18 to produce a conically rotating radio energy receiving beam, as in the previous embodiments. Duplexing circuit 54 automatically functions to form individual connection between antenna elements 12, 13 and 14 and amplifiers 51, 52 and 53, and between mixer circuits 16, 17 and 18 and the antenna elements. A duplexing circuit constructed in accordance with the principles disclosed in the application of Leo C. Young and Robert M. Page, Serial No. 326,640, filed March 19, 1940, for Impedance Coupling and Decoupling System, adequately serves this purpose. Alternatively, a system such as shown in the Wolff and Hershberger Patent 2,401,717 issued June 4, 1946, or the Girardeau Patent 1,035,958 issued August 10, 1912, may be used for this purpose. The outputs of mixer circuits 16, 17 and 18 are fed through intermediate frequency amplifier 24, pulse detector 42 and pulse amplifier 43 to modulator circuits 25, 26 and 27, as in the previous embodiment, while the output of the latter modulator circuits are applied to deflection plates 28, 29 and 30 of oscillograph 39. The horizontal and vertical deflection plates of the oscillograph are supplied with the proper voltage from sweep circuit 36, the operation of which is controlled by synchronizer 40 in a manner discussed heretofore. Since modulator circuits 55, 56 and 57, 16, 17 and 18, and 25, 26 and 27 are supplied with three-phase sinusoidal voltage from supply 19, with the voltage supplied to corresponding modulator circuits being in phase with each other, the conically rotating beam of radio energy, the conically rotating receiving beam, and the electron beam of oscillograph 39, all rotate in synchronism. The indications of remote objects produced on the screen of oscillograph 39 are similar to the indications previously disclosed and described with reference to the disclosure of Fig. 2, but are of a higher degree of accuracy since a single antenna is utilized for transmission as well as for reception, and since the directional beam of radio energy is conically rotated in synchronism with conical rotation of the receiving beam. Operation of this arrangement is similar to operation of the radio echo ranging apparatus shown in Fig. 2 and further discussion thereof is believed unnecessary.

Figure 8:
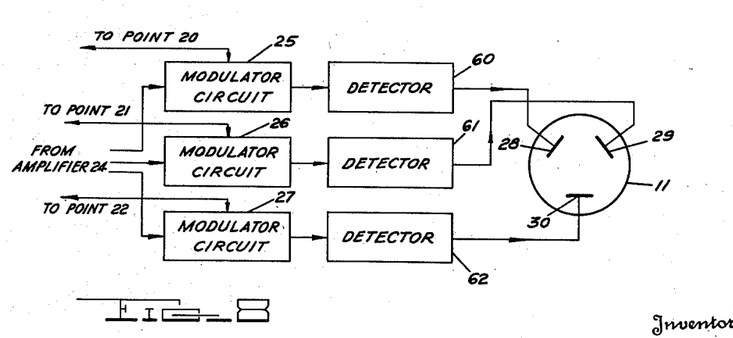
Fig. 8 is a diagrammatic showing of a still further embodiment of the invention.

A still further embodiment of the invention is shown in Fig. 8. This embodiment is a modification of the direction finder shown in Fig. 1 and produces an indication on the screen of oscillograph 11 from which the direction of a source of electrical energy, as well as the amount and direction that the antenna is pointing away from the source is more readily obtained. More particularly, this device produces a circular mark on the screen of oscillograph 11 that at all times corresponds to the position of the source of electrical energy with respect to the circular path which the conically rotating receiving beam describes. With this arrangement, the circle on the oscillograph screen occupies a position at the center of the screen when the antenna is pointing directly toward the source of electrical energy, that is, when the receiving beam follows a circular path equally distant from the energy source. When the antenna is not pointing directly toward the energy source, the receiving beam is not following a circular path equally distant from the source, and the circle on the oscillograph is displaced in a certain direction and by a certain degree from the center of the screen to represent the relative positions between the rotating receiving beam and the electrical energy source. Since the indication on the screen of the oscillograph always remains in the form of a circle the position of which varies, with respect to the center of the screen, in accordance with the position of the energy source with respect to the circular path of the receiving beam, the directional indications are of a high degree of accuracy and are more readily determined.

The foregoing is accomplished by including a suitable detector circuit in the output of modulator circuits 25, 26 and 27 and by constructing the modulator circuits in such a manner as to prevent application of three-phase sinusoidal voltages to deflection plates 28, 29 and 30. As shown, detectors 60, 61 and 62 are respectively connected in the outputs of modulator circuits 25, 26 and 27. The voltages applied to deflection plates 28, 29 and 30 are thus uni-directional in character, the amplitude of which vary sinusoidally with a 120° phase difference between the voltage applied to each plate. When antenna 10 is pointing directly toward a source of electrical energy so that the receiving beam follows a circular path equally distant from the source, the amplitudes of the sinusoidal voltages applied to deflection plates 28, 29 and 30 vary equally and a circular trace is produced on the oscillograph screen that is equally distant from the periphery thereof. Whenever the antenna is not pointing directly toward an electrical energy source, the receiving beam does not follow a circular path equally distant from the source, and the amplitudes of the voltages applied to deflection plates 28, 29 and 30 vary unequally as a function of the sine. Since detectors 60, 61 and 62 maintain the applied voltages uni-directional in character, the trace produced on the oscillograph screen always remains in a circular form, and the position thereof, with respect to the center of the screen, varies in accordance with the unequal sinusoidal amplitudes of the applied voltages. The circular trace is displaced with respect to the center of the screen, to occupy the exact position of the electrical energy source with respect to the circular path of the receiving beam, since the receiving beam and the electron beam of the oscillograph are rotated in synchronism.

There is thus provided by the present invention novel method and means for direction finding, that operates to produce continuous indications of directional characteristics between the apparatus and a source of electrical energy, such as an aircraft radio beacon for example. The indications provided by this apparatus are such that the amount and direction that the apparatus has deviated from an electrical source may be readily determined with a high degree of accuracy without necessitating abnormal skill on the part of the operator. Moreover, the present invention provides a novel radio echo apparatus which functions to provide means for accurately indicating directional characteristics between remote objects and the apparatus. These indications are of such accuracy and are produced with a high degree of reliability so that the same may be utilized for directing gun fire toward remote objects.

Although several embodiments of the present invention have been disclosed and described in detail herein, it is to be expressly understood that various changes and substitutions may be made therein without departing from the spirit of the invention as well understood by those skilled in the art. For example, mechanical means may be provided for rotating a receiving beam in such a manner that the beam describes a conical envelope. Reference therefor is to be had to the appended claims as a definition of the limits of the invention.

The invention described herein may be manufactured and used by or for the Government of the United States of America for governmental purposes without the payment of any royalties thereon or therefor.

What is claimed is:

1. In a direction finder, receiver means producing three beams orientated 120° with respect to each other about a fixed point, means modulating said beams with a source of three-phase sinusoidal voltage for producing a conically rotating beam, said conically rotating beam directionally controllable to follow a circular path about a source of electrical energy whereby the amplitude of received energy varies in accordance with the distance between said source and said beam as the latter rotates, means modulating the received energy with said three-phase sinusoidal voltage, and means impressing said modulated energy on the deflection plates of an oscillograph for producing a circular sweep which rotates in synchronism with rotation of said beam.

2. In an apparatus for determining range and direction of remote objects, means producing a directional energy emission, receiver means producing a conically rotating beam, said beam adjustably positionable to follow a circular path about a remote object and receive energy reflections in accordance with the distance between said object and said beam as the latter rotates when said directional energy emission impinges upon said object, an oscilloscope, means producing a time sweep of the electron beam of said oscilloscope synchronized with said directional energy emission, means coupled to said oscilloscope operative responsive to the receipt by said rotating beam of a returned energy reflection to produce an indication thereof on said time sweep at a point corresponding to range of the object producing said energy reflection, and means operable synchronously with the rotation of said beam to produce a rotating field for said oscilloscope, whereby said indication is rotated about said point synchronously with the rotation of said beam.

3. In a radio echo apparatus, means producing a directional energy emission, receiver means producing a conically rotating beam, said beam adjustably positionable to follow a circular path about a remote object so that the amplitude of received energy varies in accordance with the distance between said object and said beam as the latter rotates, means producing reflected energy indications on an oscillograph in accordance with the received energy, means rotating said indications in synchronism with rotation of said beam, and means varying the amplitude of said indications in accordance with the distance between said object and said beam as the latter rotates.

4. In a radio echo apparatus, means producing a directional pulse energy emission, receiver means producing a conically rotating beam, said beam adjustably positionable to follow a circular path about a remote object to receive pulse energy reflections having amplitudes responsive to the distance between said object and said beam as the latter rotates, means producing a time sweep on an oscillograph synchronized with said pulse energy emission, means producing reflected pulse energy indications at a point on said sweep corresponding to range of said object, means rotating said pulse indications about said point in synchronism with rotation of said beam, and means varying the amplitude of said indications in accordance with the distance between said object and said beam as the latter rotates.

5. In a radio echo apparatus, means producing a pulse energy emission, receiver means producing a conically rotating directional beam, said beam adapted to follow a circular path about a remote object to receive pulse energy reflections having amplitudes varying in dependency on the distance between said object and said beam as the latter rotates when said pulse energy emission impinges upon said object, an oscillograph having a viewing screen including means producing a beam of electrons, means linearly deflecting said electron beam in synchronism with said pulse emission, means producing indications on said sweep in accordance with the time of reception of said reflected pulses, the last-named means including means producing said indications at a point on said sweep corresponding to range of said object, means rotating said indications about said point corresponding to the angular position of said beam with respect to said object at the instant of reception, and means varying the amplitude of said indications in accordance with the distance between said object and said beam at the instant of reception.

6. In a radio echo apparatus, means producing a directional pulse energy emission, receiver means producing a conically rotating beam, said beam adapted to follow a circular path about a remote object to receive pulse energy reflections having amplitudes varying in dependency on the distance between said object and said beam as the latter rotates when said directional pulse energy emission impinges upon said object, an oscillograph having a viewing screen including means producing a beam of electrons, means linearly deflecting said electron beam in synchronism with said pulse emission, means responsive to received pulse energy producing a beam deflection indication at a point on said sweep which corresponds to range of said object, means rotating said indication in synchronism with rotation of said beam, and means varying the amplitude of said indication in accordance with the distance between said object and said beam as the latter rotates.

7. In a radio apparatus, means producing a directional pulse energy emission, receiver means producing a conically rotating beam, said beam adapted to follow a circular path about a remote object to receive pulse energy reflections having amplitudes varying in dependency on the distance between said object and said beam as the latter rotates when said directional pulse energy emission impinges upon said object, an oscillograph having a viewing screen including means producing a beam of electrons, means linearly deflecting said electron beam in synchronism with said pulse emission, means responsive to received energy pulses producing electron beam deflection indications at a point on said sweep which corresponds to range of said object, means modulating said received energy pulses for rotating said indication in synchronism with rotation of said beam, and means varying the amplitude of said indications in accordance with the distance between said object and said beam as the latter rotates.

8. In a radio echo apparatus, a directional beam antenna, means producing a conically rotating directional radio pulse emission from said antenna, receiver means producing a conically rotating directional beam from said antenna, said beam adapted to follow a circular path about a remote object and receive radio pulse reflections therefrom of strength varying in accordance with the distance between said object and said beam as the latter rotates when said directional radio pulse emission follows a circular path about said object, means producing a time sweep on an oscillograph synchronized with said radio pulse emission, means responsive to received radio pulses producing deflections indications on said sweep at a point thereof indicative of the range of said object, means rotating said radio pulse emission, said beam and said indications in synchronism, and means varying the amplitude of said indication in accordance with the distance of said object with respect to said beam as the latter rotates.

9. In a radio echo apparatus, an adjustably positionable directional beam antenna, means producing a conically rotating directional radio pulse emission from said antenna, receiver means producing a directional beam from said antenna, means rotating said beam in the conical envelope developed by said directional energy emission, said beam adapted to follow a circular path about a remote object and receive radio pulse reflections therefrom of strength varying in dependency on the distance between said object and said beam as the latter rotates when said directional radio pulse emission follows a circular path about said object, means producing a time sweep on an oscillograph synchronized with said radio pulse emission, means responsive to received radio pulses producing deflection indications on said sweep at a point thereof indicative of the range to said object, means rotating said radio pulse emission, said beam and said indications in synchronism, and means varying the amplitude of said indications in accordance with the distance of said object and said beam as the latter rotates.

10. In a direction finder, receiver means operable to produce a conically rotatable directional receiving beam, said beam being adjustably positionable to follow a circular path about a remote energy source whereby the received energy has an amplitude responsive to the distance between the remote energy source and axis of said beam as the latter rotates, a cathode ray tube indicator, means deflecting the beam thereof in response to the receipt of a signal from said remote energy source to produce an indication of the presence thereof, and means rotating said indication about a point on the screen of said cathode ray tube in synchronism with the rotation of said receiving beam, said last named means including apparatus for varying the amplitude of said indication in accordance with the distance between said object and the receiving beam axis as the latter rotates.

11. In a direction finder, receiver means operable to produce a conically rotated directional receiving beam, said beam being adjustably positionable to follow a circular path about a remote energy source whereby the received energy has an amplitude responsive to the distance between the remote energy source and axis of said beam as the latter rotates, a cathode ray tube indicator, means deflecting the beam thereof in response to the receipt of a signal from said remote energy source to produce an indication of the presence thereof, and means rotating said indication about a point on the screen of said cathode ray tube in synchronism with the rotation of said receiving beam.

12. In a direction finder, receiver means producing a directional receiving beam, means rotating said beam to describe a circle about a source of electrical energy, an oscilloscope, electron beam deflection circuit means producing a circular sweep of the electron beam of said oscilloscope synchronized with the rotation of said directional receiving beam, and means coupling the output of said receiver means to said electron beam deflection circuit means operative to deflect the electron beam trace in response to the received energy signal.

13. In a direction finder, an adjustable antenna producing a directional receiving beam, means conically rotating said directional receiving beam so that said beam follows a circular path about a source of electrical energy when said antenna is adjusted to point directly toward said source whereby the energy received is modulated in accordance with the distance between said source and said receiving beam as the latter rotates, an oscillograph including means generating an electron beam and beam deflection means, and means supplying said received energy to the beam deflection means of said oscillograph to deflect said electron beam about a reference point in a manner corresponding to the rotation of said directional beam about said source.

ROBERT M. PAGE.

REFERENCES CITED

The following references are of record in the file of this patent:

UNITED STATES PATENTS

| Number | Name | Date |
|---|---|---|
| 2,014,732 | Hansell | Sept. 17, 1935 |
| 2,083,242 | Runge | June 8, 1937 |
| 2,231,929 | Lyman | Feb. 18, 1941 |
| 2,263,377 | Busignies et al. | Nov. 18, 1941 |
| 2,282,402 | Hefele | May 12, 1942 |
| 2,297,249 | Runge | Sept. 29, 1942 |
| 2,400,641 | Hardy | May 21, 1946 |
| 2,403,967 | Busignies | July 16, 1946 |
| 2,408,039 | Busignies | Sept. 24, 1946 |
| 2,408,040 | Busignies | Sept. 24, 1946 |
| 2,410,666 | Leck | Nov. 5, 1946 |
| 2,412,669 | Bedford | Dec. 17, 1946 |
| 2,412,702 | Wolff | Dec. 17, 1946 |
| 2,412,703 | Wolff | Dec. 17, 1946 |
| 2,422,361 | Miller | June 17, 1947 |

FOREIGN PATENTS

| Number | Country | Date |
|---|---|---|
| 635,793 | Germany | Sept. 28, 1936 |